Patented Aug. 10, 1943

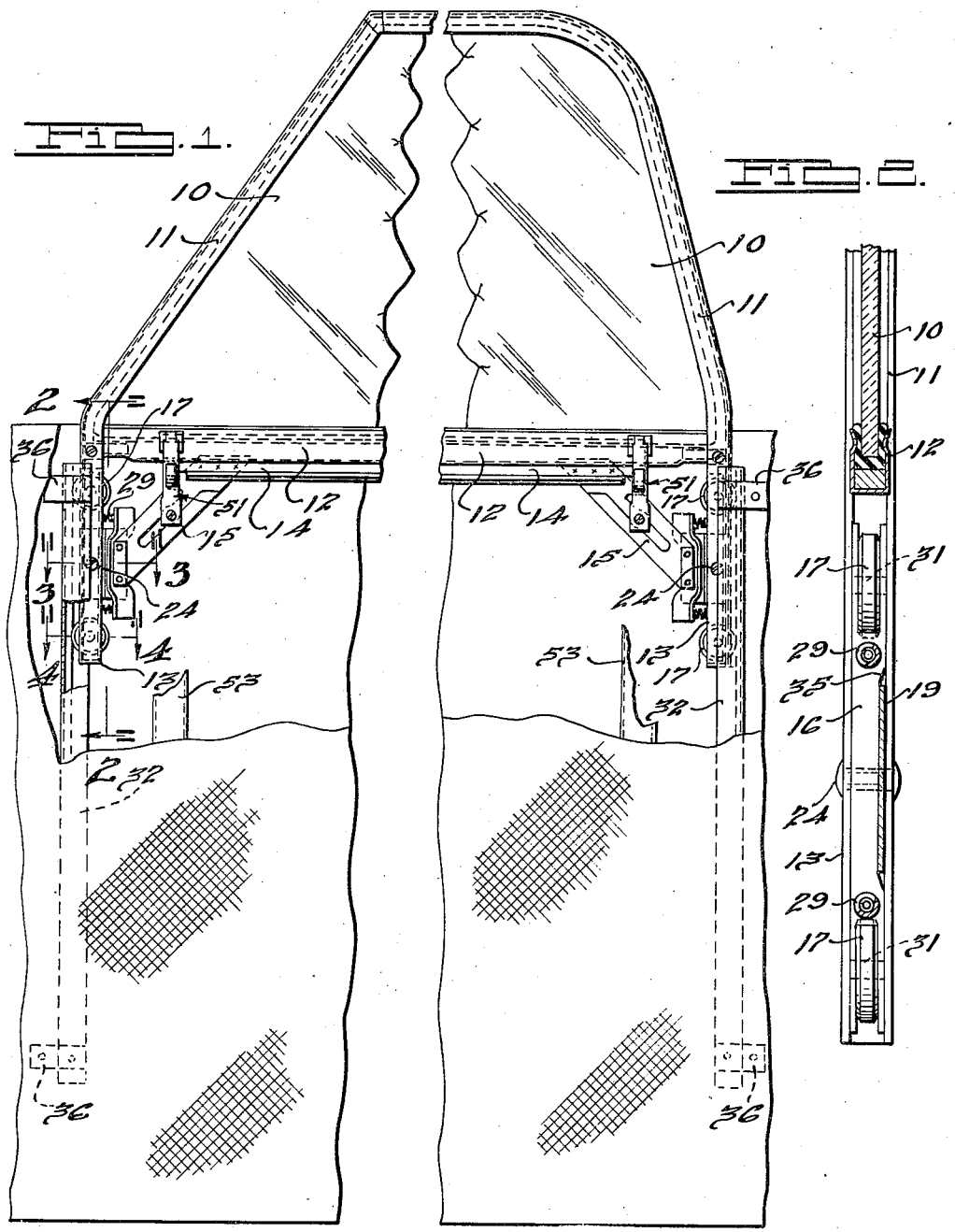

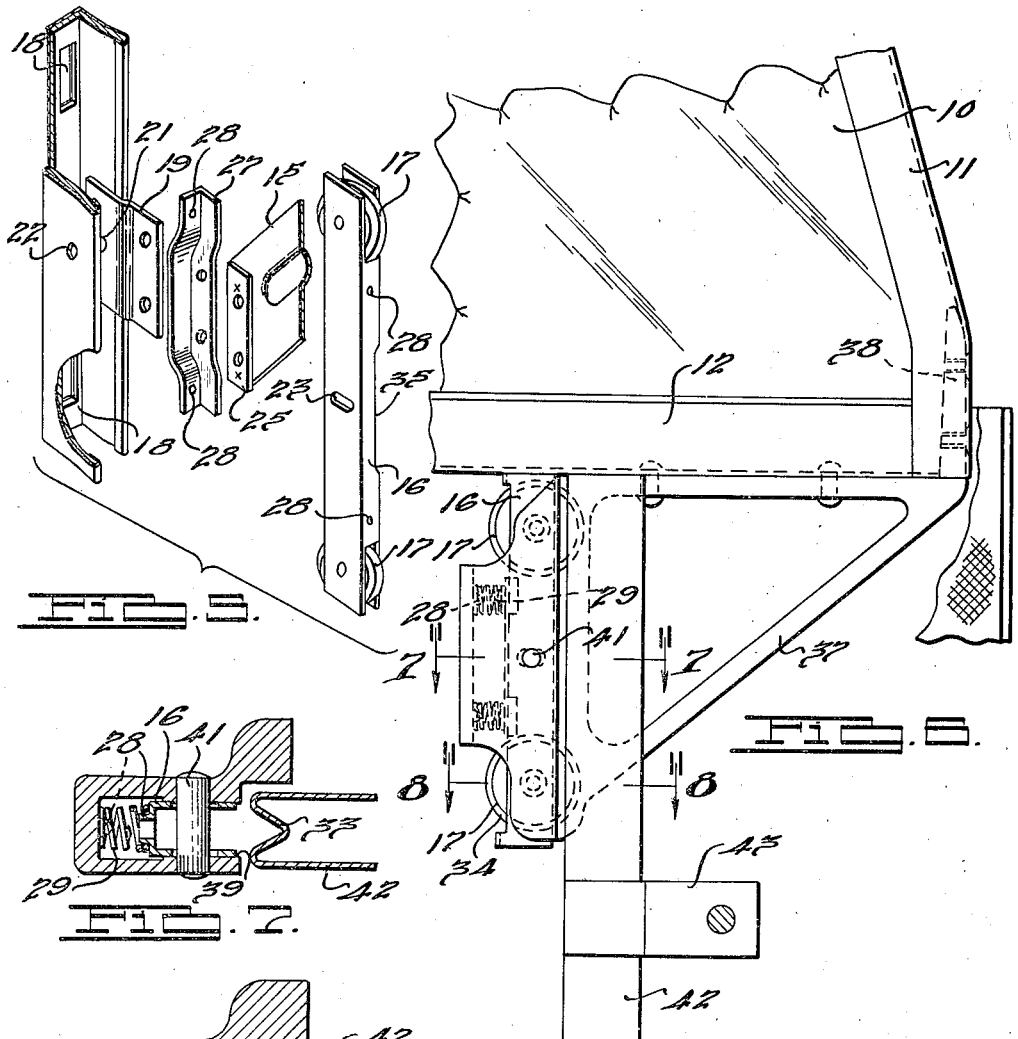

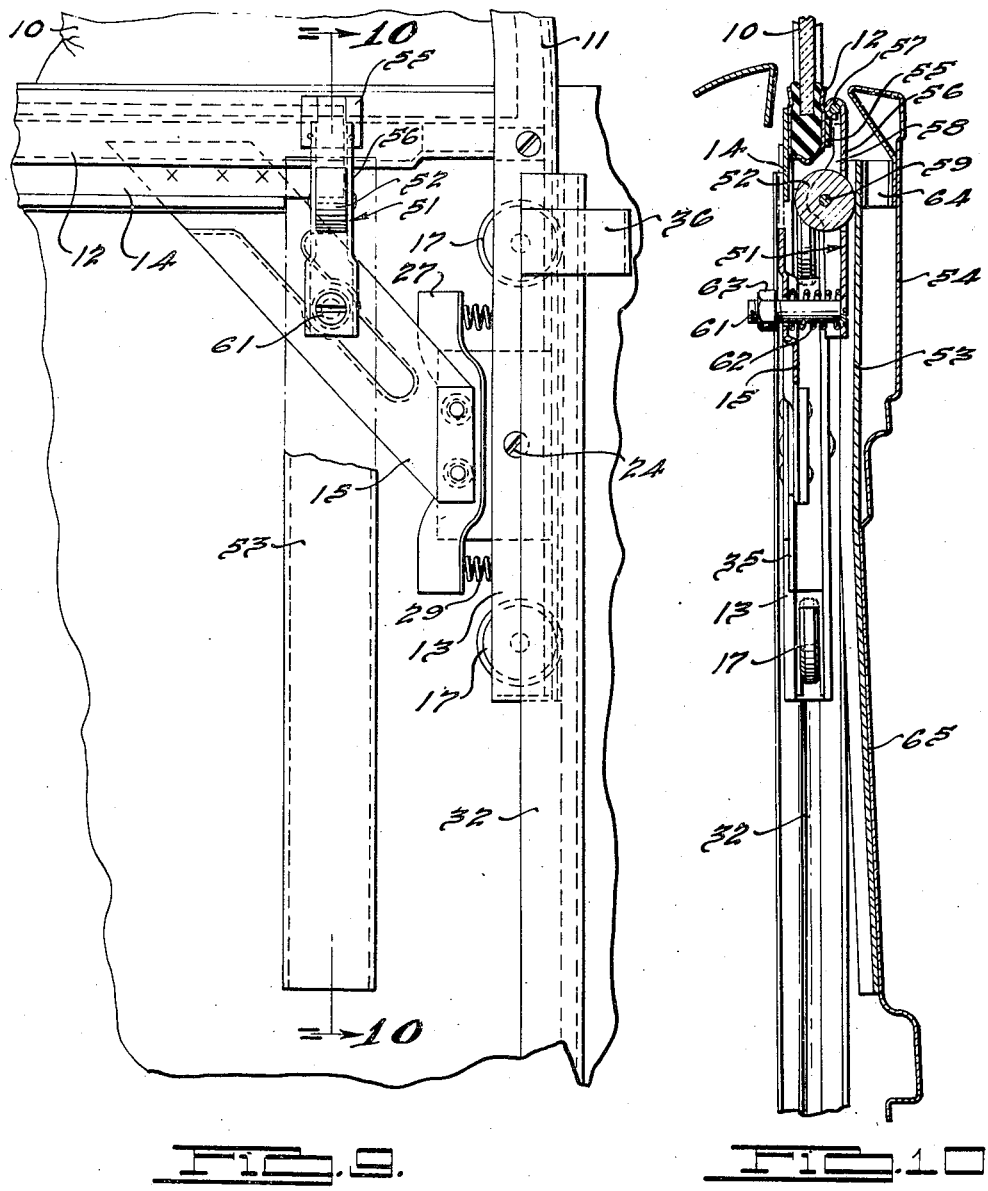

2,326,532

UNITED STATES PATENT OFFICE 2,326,532

WINDOW CONSTRUCTION

Otto F. Graebner, Detroit, Mich., assignor to The Murray Corporation of America, Detroit, Mich., a corporation of Delaware Application May 19, 1939, Serial No. 274,493

2 Claims. (Cl. 296—44.5)

My invention relates to window supporting mechanism and particularly to supporting means for a window which permits the window to be raised and lowered from and into the well by mechanism supported wholly within the well.

In the copending application of Alfred H. Haberstump, Serial No. 245,575, filed December 14, 1938, now Patent No. 2,246,249, dated June 17, 1941, and assigned to the assignee of the present invention, a mechanism was disclosed and claimed which was attached to projecting legs on a window frame which operated in channels one of which was spring pressed. A V-shaped groove was provided in the channel and wheels on the legs were bevelled to fit the groove to provide support against tilting both in the plane of the glass and laterally thereof.

The present invention is a modification of the invention of the application above mentioned, wherein the construction is simplified while maintaining the same or increasing the rigidity of the window when in raised position. In the present construction, the wheels are mounted on an element having sufficient length to space the wheels a material distance apart and a slot is provided in the element medially of the wheels by which the element is secured to the legs of the window frame. A pin supports the element for tilting movement as well as movement toward and away from the guide channel. Springs are provided on the back of the element adjacent to the wheels for urging the element and wheels bodily outwardly toward the guide channel.

The guide channels are rigidly mounted and the springs on the carriage are depended upon to retain the wheels in contact with the notch in the channels while permitting the tilting of the wheel supporting element or its bodily movement toward and from the notch. On the front door and on some rear doors, the channels are mounted at the side edges of the well to have the legs move upwardly and downwardly therein. In certain rear doors having a cutaway portion, one channel is disposed out of the plane of the window and inwardly of the edge within the well and the wheel supporting element is mounted to align with the channel to have the wheels thereof operate within the channel notches to function in the same manner as the wheels function in the channel at the end of the well in the plane of the window.

At the side of the door panel, additional trackways are provided, of inwardly presented channel formation in which rollers mounted on the side of the window supporting mechanism engage. Each of the rollers is mounted on an independently hinged support having a spring associated with the end opposite to that which is pivoted to force the rollers outwardly of the support into the guides. The additional side supports for the window resists the movement of the window normal to its plane when in raised position. The trackways may slope away from the plane of the window toward the bottom to decrease the spring pressure on the rollers which thereby decreases the amount of effort required to operate the window mechanism.

Accordingly, the main objects of my invention are: to support a window by wheels on a tiltable element operating in channels which are rigidly mounted within the well of a door or vehicle body; to provide a window having rollers on the ends engaging end trackways with spaced rollers on the side which engage spaced trackways within the window well disposed out of the plane of the window; to provide an element with spaced rollers having bevelled edges which are spring pressed outwardly in a V-groove channel; to mount an element having rollers for pivotal and bodily movement when urged by springs disposed on opposite sides of a supporting pivot; to provide a bracket for reinforcing the edge of a window in which an element is mounted for pivotal and bodily movement when urged by springs disposed on opposite sides of a supporting pivot to force the wheels of the element against a V-notch in a guide rail which is rigidly mounted within a window well; and in general, to provide means for supporting a window which is simple in construction, positive in operation, and economical of manufacture.

Other objects and features of novelty of my invention will be either specifically pointed out or will become apparent when referring, for a better understanding of the invention, to the following description taken in conjunction with the accompanying drawings, wherein:

Figure 1 is a broken view in elevation of a window supporting mechanism embodying features of my invention;

Fig. 2 is an enlarged sectional view of the structure illustrated in Fig. 1, taken on the line 2—2 thereof;

Fig. 3 is an enlarged sectional view of the structure illustrated in Fig. 1, taken on the line 3—3 thereof;

Fig. 4 is an enlarged sectional view of the structure illustrated in Fig. 1, taken on the line 4—4 thereof;

Fig. 5 is an exploded view of the window supporting element which is attached to the window frame, as illustrated in Fig. 1;

Fig. 6 is an enlarged broken view of the structure similar to that illustrated in Fig. 1, showing a modified form of my invention;

Fig. 7 is an enlarged sectional view of the structure illustrated in Fig. 6, taken on the line 7—7 thereof;

Fig. 8 is an enlarged sectional view of structure illustrated in Fig. 6, taken on the line 8—8 thereof;

Fig. 9 is an enlarged view of the upper right hand corner of the window well illustrated in Fig. 1 with the side trackways broken away; and, Fig. 10 is a sectional view of the structure illustrated in Fig. 9, taken on the line 10—10 thereof.

Referring to Figs. 1 to 5, a window glass 10 is supported within a frame 11 of inverted U-shape following the contour of the glass edge. A cross member 12 encloses the bottom edge of the window glass while extensions 13 project therebelow. The extensions or legs 13 are of inwardly presented channel form and are continuations of the frame 11. The cross member 12 has a window mechanism engaging elements 14 by which the window is raised and lowered in a conventional manner. Braces 15 interconnect the cross-member 12 to the legs 13 of the frame in a manner to be more specifically pointed out hereinafter.

An element 16 of channel shape supports bevelled rollers 17 in position to extend through slots 18 provided in the web of the legs 13. A bracket 19 is welded to the inner face of one of the flanges of the channel leg 13 having an aperture 21 therein aligned with the aperture 22 on the opposite flange. The element 16 is provided with a slot 23 medially between the wheels 17 which is aligned with the apertures 21 and 22 and through which a cap and screw 24 projects to retain the element 16 within the leg for tilting as well as bodily movement to and from the web thereof. The braces 15 have a plate 25 welded thereon and tapped to receive a pair of screws 26.

An angle element 27 is supported between the bracket 19 and the brace 15 as illustrated more clearly in Fig. 3. The angle element and the web of the element 16 are provided with projections 28 which are in aligned relation and which project within the ends of coil springs 29 which thereby urge the element 16 toward the web of the legs 13. When assembling the mechanism, it is only necessary to support the element 16 on the cap and screw 24 after which the angle element 27 and the brace 15 is assembled on the bracket 19 by the screws 26. It will be noted from Fig. 4 that the wheels 17 are retained on axles 31 which are prevented from moving laterally by the flanges of the legs 13.

It will be further noted that the rail 32 is rigidly supported within the window well and that the springs 29, contacting the element 16, are depended upon to provide sufficient resiliency to permit the proper operation of the window while retaining the window against tilting movement in its plane or laterally thereof. The rails 32 are provided with a V-shaped groove 33 in which the bevelled periphery 34 of the wheel engages to prevent the lateral tilting of the window. It will be further noted that the element 16 is of channel formation presenting outwardly toward the web of the inwardly presenting channel of the leg 13 and that the central portion 35 is offset inwardly to provide clearance for the bracket 19 as shown more clearly in Fig. 2.

Referring to Figs. 6, 7, and 8, I have shown a further modified form of my invention, wherein a casting 37 has a projecting end 38 for strengthening the corner of the window and for providing a support for the element 16. The casting forms a bracket having an outwardly presented channel 39 in which the element 16 is retained for bodily and tilting movement by a pin 41 which is press fitted into the casting. Projections 28 are provided on the casting and on the element 16 projecting into the ends of the springs 29 which bodily urge the element 16 outwardly of the channel 39. The rollers 17 of the carriage have a bevelled edge 34 which operates in a V groove 33 forming the web of an outwardly presented channel shaped rail 42 which is rigidly secured within the well by a plurality of brackets 43.

The wheels operate in a V-groove 33 in the same manner as when the rail and wheel were disposed at the edge of the well in the plane of the window. The inward disposition of the rail and carriage provides support for the window in the well when the cutaway portion of the door is employed at the rear lower edge thereof. The springs 29 function in the same manner for urging the element 16 against the V-groove 33 of the rail while the opposite edge of the window is provided with a leg 13 supporting an element 16 with its wheels 17 engaging a V-groove in a rail as described hereinabove and illustrated in Figs. 1 to 5 inclusive. It is to be understood that where desirable a pair of brackets 37 and rails 42 offset from the plane of the window and inwardly of its edge may be employed to provide clearance at both edges of the window when such clearance is desirable.

As illustrated more particularly in Figs. 1, 9, and 10, additional spring-pressed roller support is provided to the window 10 normal to its plane by roller supporting mechanisms 51 which are attached to the cross member 12 below the window pane. The rollers 52 of the roller mechanisms cooperate with spaced trackways 53 of inwardly presented channel formation which are supported by the inner panel 54 of the vehicle door or body.

Each roller mechanism 51 embodies a hinge wing 55 which is welded or otherwise secured to the cross brace 12 of the window frame. An elongated hinge wing 56 is secured thereto by a pivot 57. The wing is flanged at the sides 58 and is extended to provide a support for the shaft 59 of the roller. On the end of the hinge leaf 56 opposite to that secured by the pivot 57, a bolt 61 is mounted to receive a coil spring 62 which abuts against the corner brace 15 to urge the hinge leaf 56 and therefore the roller 52 outwardly against the web of the channel guide rail 53. A nut 63 on the bolt 62 limits the outward movement of the hinge leaf 56.

The channel guide elements 53 are supported at the top by brackets 64 and are sloped inwardly medially of their length and attached directly to the panel as at 65. By so sloping the channel guides the tension between the roller 52 and guides 53 is reduced when the window is lowered which decreases the effort required to initially raise the window and provides a rigid support therefor only when raised a material distance out of the well.

It will, therefore, be apparent that I have provided rigidly to a window supporting structure which is disposed wholly within a window well for retaining the window against tilting movement in its plane and laterally thereof. The element 16 is mounted to be free to tilt or to be moved bodily outwardly when urged by springs contacting the back of the element. This eliminates the spring pressed rail heretofore employed and simplifies the construction while increasing the rigidity of the window mounting. A reinforcing bracket employed for the corner of the window is provided with an outwardly presented channel for supporting the element 16 inwardly of the window edge in contact with a channel rail disposed inwardly thereof. This provides a support for the edge of the window within the well when the lower corner thereof is obstructed in such manner as to prohibit the use of the rail at that point.

The spring pressed rollers on the lower cross member of the window frame provide a resistance to a movement normal to the plane of the window, especially in its completely raised position. The guideways for the rollers may slope away from the plane of the window medially of their length to decrease the spring tension provided therebetween as the window is lowered while providing a maximum tension when the window is near its raised position.

While I have described and illustrated but a single embodiment of my invention, it will be apparent to those skilled in the art that various changes, omissions, additions, and substitutions may be made therein without departing from the spirit and scope of my invention, as set forth in the accompanying claims.

I claim as my invention:

1. A window supporting device including, in combination, an inverted U-shaped frame encompassing a window pane, the ends of which project therebelow forming legs of inwardly presented channel shape having apertures in the webs thereof, a bracket secured to and projecting from the side flange of each of said legs, elements having a slot disposed laterally thereof pivoted to the flanges of each of said legs for tilting and bodily movement toward and from the webs thereof, bevelled wheels pivoted near the ends of said elements in a position to project through the apertures of said webs, spring supporting members, bracing members, and means for securing a spring supporting member and a bracing member to each of said brackets, and springs disposed between each of said element and spring supporting member for urging said element toward the webs of said legs.

2. A window supporting device including, in combination, an inverted U-shaped frame encompassing a window pane, the ends of which project therebelow forming legs of inwardly presented channel shape having apertures in the webs thereof, a bracket secured to and projecting from the side flange of each of said legs, elements having a slot disposed laterally thereof pivoted to the flanges of each of said legs for tilting and bodily movement toward and from the webs thereof, bevelled wheels pivoted near the ends of said elements in a position to project through the aperture of said webs, spring supporting members, bracing members, means for securing a spring supporting member and a bracing member to each of said brackets, springs disposed between each of said element and spring supporting member for urging said element toward the webs of said legs, and rails having fixed V-grooves therealong in which said wheels are urged by said springs.

OTTO F. GRAEBNER.